Patented Sept. 30, 1924.

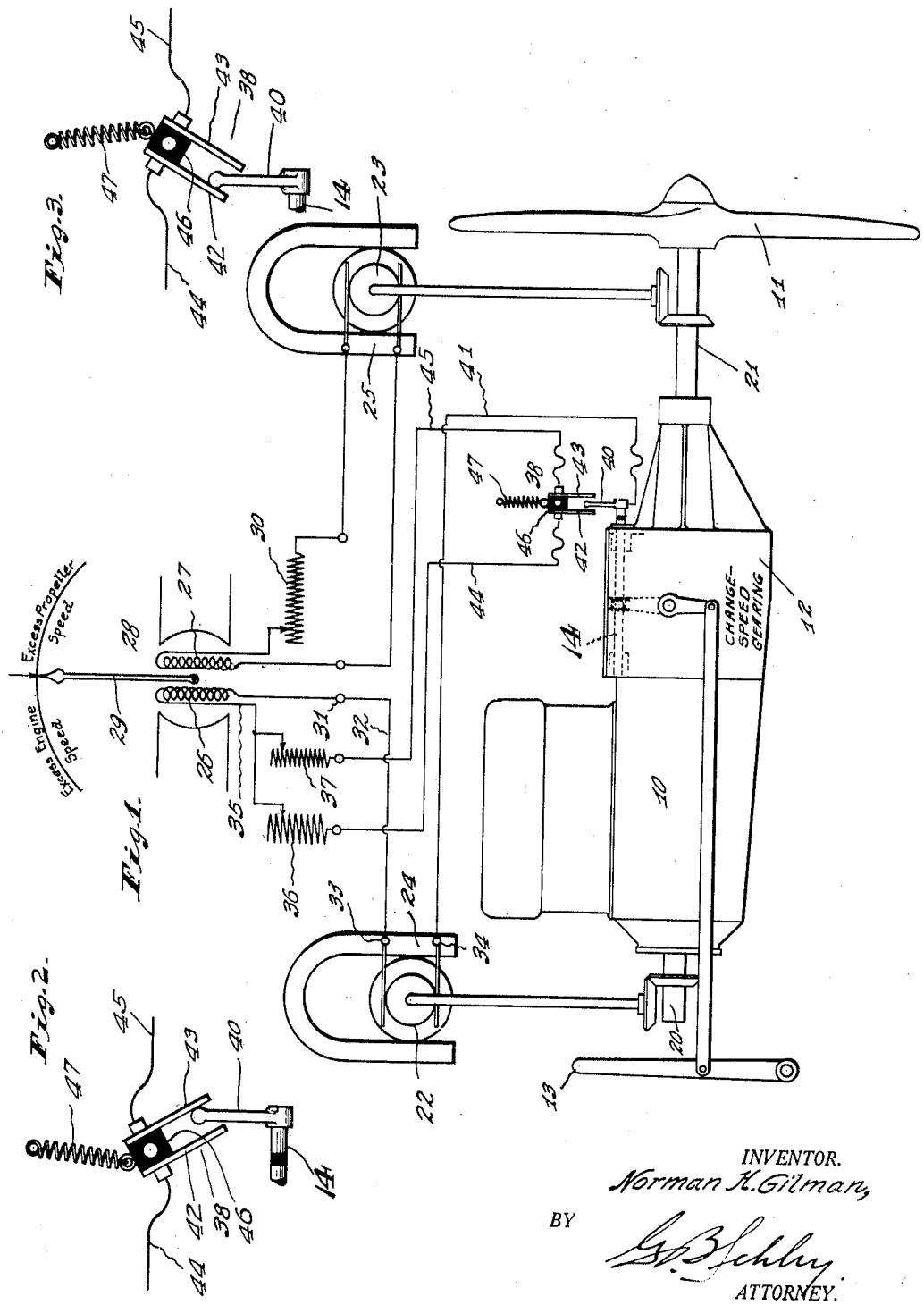

1,510,440

UNITED STATES PATENT OFFICE.

NORMAN H. GILMAN, OF INDIANAPOLIS, INDIANA, ASSIGNOR TO ALLISON ENGINEERING CO., OF INDIANAPOLIS, INDIANA, A CORPORATION OF INDIANA.

CHANGE-SPEED INDICATOR.

Application filed June 22, 1923. Serial No. 647,161.

*To all whom it may concern:*

Be it known that I, NORMAN H. GILMAN, a citizen of the United States, residing at Indianapolis, in the county of Marion and State of Indiana, have invented a new and useful Change-Speed Indicator, of which the following is a specification.

It is the object of my invention to produce a simple and reliable indicator for indicating when two parts about to be intermeshed in a change-speed gearing are traveling at the same peripheral speed, so that they are in condition to be intermeshed without clashing.

In the driving of automotive devices by internal combustion engines, there is usually a change-speed gearing between the engine and the propelling device. The shifting of gears in such a change-speed device is a matter requiring some skill. This is especially so in automobiles, even with the skillful driver, in changing from a higher gear to a lower gear while the automobile is moving at considerable speed; and inability to shift gears has sometimes resulted in loss of life, as when a car is descending a steep grade and the driver in attempting to shift from high gear to a lower gear is unable to produce meshing of the gears in the lower-gear position. While this is bad enough in ground-traveling automobiles, it is even worse in air-planes; for driving mechanism is now being made for air-planes which involves a change-speed gearing between the engine and the propeller, and it may easily be fatal if a desired change in gearing after once being started can not be completed.

By my invention, I provide a reliable indicator, which indicates what the relative peripheral speeds are of two parts which it is desired to intermesh, what change in engine speed should be made to bring such two parts to the same peripheral speed, and when such equality in peripheral speed is obtained. In carrying out my invention, I provide two devices, preferably electric generators, which are connected to the driving and driven shafts on the two sides of the change-speed gearing respectively; and connect these two devices to oppose each other in a suitable measuring device which when at a given point, preferably zero, indicates that the two parts it is desired to intermesh are at the same peripheral speed, and when at other than that given point indicates which of the two parts to be intermeshed is moving too fast and thereby indicates the proper correction; and I selectively connect one of these speed-responsive devices to the measuring instrument through different pressure-reducers, such as circuits of different resistance in the case of electric generators, corresponding to the different speed changes, to get the same "zero" indication at the measuring instrument for all sets of gears to be intermeshed.

The accompanying drawing illustrates my invention: Fig. 1 is a diagrammatic view showing my invention as applied to an engine driving an air-plane propeller; and Figs. 2 and 3 are details showing different positions of the switch operated by the shifter-rod.

The engine 10 drives the propeller 11, or other propelling device if the invention is applied to something other than an air-plane, through an interposed change-speed gearing 12. For simplicity of illustration, this change-speed gearing is shown as having only two speed changes, for high gear and low gear respectively. These are produced by shifting the gear-shift lever 13 in either direction from the neutral position shown in Fig. 1, to shift longitudinally the shifter rod 14 of the change-speed gearing 12 from the neutral position to either high gear or low gear. While I have shown only two changes of gear, it is obvious that any number of changes may be provided, as is common in change-speed gearings.

The shaft 20 of the engine 10 and the shaft 21 of the propeller 11 are connected in any desired way to drive two electric generators 22 and 23. These generators are of any suitable type, and the permanent field-magnets 24 and 25 shown are illustrated merely by way of example.

These two generators 22 and 23 are connected to two exciting windings 26 and 27 of a suitable meter 28. The movable member 29 of this meter is acted on oppositely by the two windings 26 and 27; and it takes "zero" position when the pulls of the two opposed windings 26 and 27 are equal, but takes some other position than zero when the pulls of such two opposing windings are not equal.

One of the meter windings, here the winding 27, is permanently connected to its associated generator, here the generator 23, to be continuously excited thereby. If desired, there may be an interposed resistance 30, as for calibration, though that is not essential. The other meter winding, here the winding 26, has one terminal 31 connected by a wire 32 to one terminal 33 to its associated generator, here the generator 22. The other terminal 34 of such generator 22 may be connected to the other terminal 35 of such winding 26 through either of two different-resistance plates, provided by resistances 36 and 37. This selective connection is made by a switch 38 controlled by the movements of the shifter-rod 14.

This switch 38 may take various forms. As shown, a switch finger 40 is mounted on the shifter-rod 14, and is connected to the generator terminal 34 by a wire 41. This switch finger 40 lies between two switch fingers 42 and 43, with either of which it may be moved into contact, but with both of which it is out of contact when in neutral position. The switch fingers 42 and 43 are connected by wires 44 and 45 to one set of terminals of the resistances 36 and 37 respectively, and the other set of terminals of said resistances are connected in common to the terminal 35 of the meter-winding 26. The two switch fingers 42 and 43 are mounted on a pivoted block 46, shown as of insulation though it is only essential that the two fingers 42 and 43 be insulated from each other; and this block 38 with its fingers 42 and 43 is spring-pressed to its neutral position in any suitable manner, as by a tension spring 47.

If now the engine 10 is driving the propeller 11 through one meshing of the gears in the change-speed gearing 12, and it is desired to shift to another gear-meshing, the gear-shift lever 13 is first shifted to neutral position to produce de-meshing. This moves the switch finger 40 to its middle position, and permits the tension spring 47 to move the block 46 and its switch fingers 42 and 43 to their intermediate position in which they are both out of contact with the switch finger 40. Then, by a combination of the same motion, if desired, the gear-shift lever is moved slightly toward the position which it will occupy when the desired intermeshing of gearing is obtained. This causes the switch finger 40 to engage one or the other of the switch fingers 42 and 43, according to which set of gears it is desired to intermesh. This engagement of the switch fingers occurs early in the movement of the gear-shift lever 13 and shifter-rod 14 from neutral, while the gears proper are still in neutral position without having any gears intermeshed. The engagement of the switch finger 40 with the switch finger 42 or 43 closes the circuit for the meter coil 26 through the resistance 36 or 37, according as high-gear or low-gear intermeshing is about to be produced. The two meter coils 26 and 27 now act in opposition on the movable meter element 29. If the engine is going too fast for the desired intermeshing of gears without clashing, the meter coil 26 predominates over the meter coil 27 and swings the movable member 29 to the left, to indicate excess engine speed; in which case the engine is permitted to slow down to produce equality in peripheral speed between the two parts to be intermeshed. If, however the engine is going too slow for such desired intermeshing without clashing, the meter coil 27 predominates over the meter coil 26 and swings the movable member 29 to the right, to indicate excess propeller speed; in which case the engine is speeded up to produce such equality in peripheral speed. When this equality speed is obtained between the two parts to be intermeshed, the two meter windings 26 and 27 balance each other, and the movable meter element 29 stands at zero. Then the gear-shift lever is moved on through to the desired points, to complete the desired intermeshing of gears; which intermeshing is obtained quietly and easily without any clashing.

The resistances 36 and 37 are of different values, to compensate for the different speed of the generator 22 with relation to that of the generator 23 for different gear-intermeshings in change-speed gearing; and for proper calibration. If the speed-changes include a direct drive, say for high gear, the high-gear resistance 36 is equal to the resistance 30; assuming that the windings 26 and 27 are alike and the generators 22 and 23 are alike. Under such conditions it is possible to omit both the resistances 30 and 36. However, I prefer to provide both such resistances, for proper calibration, and to assist in calibration I may make all the resistances 30, 36, and 37 adjustable, as shown

I claim as my invention:—

1. In combination, two members to be interconnected, a change-speed gearing between said two members for connecting them in a plurality of different gear ratios, pressure-producing devices connected to said two members to be driven thereby, and a measuring device having two elements acting in opposition and arranged to be subjected to pressures created by two pressure-producing devices connected to said two members.

2. In an automotive device, the combination of a change-speed gearing, driving and driven shafts arranged to be connected through said change-speed gearing in different speed ratios, two electric generators connected to said two shafts respectively and an electric meter having two opposed exciting windings supplied respectively by said two generators.

3. The combination set forth in claim 2, with the addition of a switch controlled by said change-speed gearing for varying the resistance of the circuit of one of said exciting windings to correspond to different gear-intermeshings of said change-speed gearing.

4. In an automotive device, the combination of a change-speed gearing, driving and driven shafts arranged to be connected through said change-speed gearing in different speed ratios, an electric meter, and exciting means for said meter driven by both said shafts.

5. The combination set forth in claim 4, with the addition of means controlled by said change-speed gearing for varying the effect on said meter of a given speed-ratio between said shafts.

6. The combination set forth in claim 2, with the addition of a switch for varying the resistance of the circuit of one of said exciting windings to correspond to different gear-intermeshings of said change-speed gearing.

7. The combination set forth in claim 4, with the addition of means for varying the effect on said meter to a given speed-ratio between said shafts.

In witness whereof, I have hereunto set my hand at Indianapolis, Indiana, this 14th day of June, A. D. one thousand nine hundred and twenty-three.

NORMAN H. GILMAN.